United States Patent [19]

Schnelle et al.

[11] Patent Number: 4,669,137
[45] Date of Patent: Jun. 2, 1987

[54] APPARATUS FOR MOVING OBJECTS OR PERSONS

[75] Inventors: Eberhard Schnelle, Rastatt; Siegmar Noth, Malsch-Voelkersbach, both of Fed. Rep. of Germany

[73] Assignee: Stierlen-Macquet AG, Fed. Rep. of Germany

[21] Appl. No.: 807,251

[22] Filed: Dec. 10, 1985

[30] Foreign Application Priority Data

Dec. 17, 1984 [DE] Fed. Rep. of Germany ....... 3446017

[51] Int. Cl.$^4$ .............................................. A61G 7/08
[52] U.S. Cl. ...................................... 5/81 R; 5/81 B; 5/81 C; 5/421
[58] Field of Search ............... 5/63, 81 R, 81 B, 81 C, 5/284, 421, 424; 198/631

[56] References Cited

U.S. PATENT DOCUMENTS

| | | | |
|---|---|---|---|
| 3,579,672 | 5/1971 | Koll et al. | 5/81 B |
| 3,765,037 | 10/1973 | Dunkin | 5/81 C |
| 3,883,991 | 5/1975 | Adelhed | 5/81 R |
| 3,947,902 | 4/1975 | Conde et al. | 5/81 R |
| 4,087,873 | 5/1978 | Ohkawa | 5/81 B |
| 4,125,907 | 11/1978 | Junginger et al. | 5/81 B |
| 4,162,393 | 7/1979 | Balboni | 5/421 |
| 4,534,077 | 8/1985 | Martin | 5/424 |

Primary Examiner—Gary L. Smith
Assistant Examiner—Michael F. Trettel
Attorney, Agent, or Firm—Harness, Dickey & Pierce

[57] ABSTRACT

An apparatus for moving persons, including a support structure (18, 20) a horizontally sliding stage (26) attached to it with a support surface (30), girdled by a continuous upper conveyor belt (36), moveable in parallel to the sliding direction of the stage (26) and with a belt guide for a lower belt (60), set parallel to the conveyor belt (36), where one of the belts (36, 60) can be driven by means of a belt drive, as well as a sliding drive for the stage (26). Here, the lower finite belt (60) is attached at both ends (68, 70) to the support structure (18, 20) and, within the range of the free stage edges, that are perpendicular to the sliding direction of the stage (26), it is guided over a bar (58) that is set parallel to them and connected to the support surface (30). Along part of its course, the lower part (40) of the conveyor belt (36) loops around a drive shaft (44) of the belt drive built into the support structure (18, 20).

15 Claims, 9 Drawing Figures

APPARATUS FOR MOVING OBJECTS OR PERSONS

TECHNICAL FIELD

This invention generally relates to conveyor mechanisms and the like, especially those adopted to move patients in hospitals.

BACKGROUND

The invention concerns an apparatus for moving objects or persons, including a support structure, to which is attached a stage, horizontally movable along it, with a rectangular support surface, girdled by an upper continuous conveyor belt, movable in parallel to the sliding direction of the stage and with a belt guide for a lower belt, parallel to the conveyor belt, where on of the belts can be driven by a belt drive, also including a sliding drive for the stage.

Such an apparatus is, for instance, known from DE-OS No. 26 26 638. In the design described there as well as in all other familiar devices of this type, the belt guide for the lower belt is shaped by an additional plate that is connected with the support surface. Here, the conveyor belt is moved in such a way that the lower belt is driven as a continuous belt by the belt drive, thus entraining the conveyor belt by friction contact. Experience has shown that, especially when smooth belt materials are used, the friction contact between the lower belt and the upper conveyor belt is not sufficient to pull heavy objects or heavy persons with the conveyor belt onto the support surface. In this case, the lower belt would slip without moving the upper conveyor belt. However, it is already known from the DE-OS method mentioned above how to provide a drive for the conveyor belt as well as for the lower belt. This, however, requires a more involved drive mechanism creating a drive connection from the belt drive below the stage to the upper loop of the conveyor belt along the sides of the stage. An apparatus for moving patients in which the transport conveyor belt is directly driven is already known from DE-AS No. 26 06 022. This only provides one border or edge for the stage across which the patient must be pulled up and again pulled down off the support surface. This allows the drive mechanism to be built near the other stage edge. This implementation solution is, however, not possible in the design mentioned at the beginning in which a patient, for instance, is pulled up over a stage edge onto the support surface and then pushed off the support surface again, over the other stage edge.

A further disadvantage of the familiar designs is that the total thickness of the stage, or both plates with the belts, respectively, is relatively great, because, for stability, the thickness of the individual plates must not drop below a certain value. Otherwise, due to the weight of the objects or people to be moved, the plates would severely bend which would make it more difficult or even impossible to change the position of the stage or the belts. On the other hand, the stage should be designed as thin as possible, because it has to be pushed between the patient and the cart.

One object of the invention is to design the apparatus mentioned at the beginning in such a way as to provide a reliable drive mechanism for the conveyor belt as well as a comfortable transfer of objects or people to be moved, but keeping the design as simple as possible.

This object, according to the invention, is solved thereby that the lower finite belt is attached at both ends to the support structure and, within the range of the free stage borders, perpendicular to the sliding direction of the stage, it (the finite belt) is carried over a bar, parallel with them and connected to the support surface, and wherein for part of its course, the lower part of the conveyor belt loops around the drive shaft of the belt drive into the support structure.

Since the design of the belt guide for the lower belt no longer provides a plate, but only a bar across which the lower belt runs at its turning points, it allows the conveyor belt to be operated by the belt drive designed below the stage. The design according to the invention, allows for a most simply designed direct drive of the transport belt. Complicated power transfer mechanisms, such as suggested in DE-OS No. 26 26 638 for the direct drive of the conveyor belt, can be omitted. In the design according to the invention, the drive mechanism for the upper conveyor belt is not only simpler, but also significantly requires much less space.

Within the area of the free stages edges, the support surface should preferably have a recess so that the bar guiding the lower belt can dip into it. Even if the thickness of the support surface is small in the area of the recess, it does, overall, not affect the stability of the support surface. On the other hand, this design allows the total thickness of the stage that must be pushed under the person to be lifted, to be reduced partically to the thickness of the support surface. This makes the pickup operation of an object or a person considerably simpler and, for a patient, gentler.

A further advantageous design implementation according to the invention, consists in that, at their ends, the bars are connected to swivel arms, set perpendicular to their longitudinal direction, and hinged to the support surface, pivoting around an axis, parallel to the longitudinal direction of the bar. This design allows the bars together with the lower belt, to be swung away from the support surface, or, respectively, the conveyor belt, so that all belt surfaces, especially the lower belt can be wiped clean and disinfected, whereas the finite lower belt in previous designs can usually be only partially directly cleaned. This point is of utmost significance when the apparatus according to the invention is used to transfer patients from a non-sterile area to a sterile area.

In a preferred design, in which the support structure includes at least one vertical column and a height adjustable lifting device attached to it to which the horizontally moveable stage is attached, according to a further characteristic of the invention, the moving parts of the sliding drive for the stage and the height adjusting drive for the lifting device are attached to the lifting device together with the belt drive. This means that all moving parts of the entire apparatus are incorporated into the lifting device and can be adjusted with it. This makes it easier to better encapsulate the moving parts in contrast to the stationary parts of the apparatus which, again, makes it easier to clean the apparatus and keep it sterile.

The design according to the invention, makes it possible to prevent sheets, clothes or the like from being pulled onto the platform between the two belts by aranging pressure sensitive contact elements within the front upper range of the bars and/or within the lower range of the deviation bars of the support surface, the contact elements being with the belt drive in such a way that they switch it off under the effect of a certain pressure threshold value being exceeded. These contact elements are preferably built as contact strips stretching across the entire receiving width of the stage.

If a patient is moved lightly clad or unclothed, such as from a sick bed onto the moving apparatus, according to the invention, it could be very unpleasant for the patient to be moved from the warm bed onto the cool conveyor belt. In order to avoid this disadvantage, according to a further characteristic of the invention, a heating unit has been built into the support surface. The heating unit is preferably to be designed as a surface unit, directly onto the underside of the upper boundary plate of the support surface where the space between the heating unit and the lower boundary plate of the support surface is filled with plastic foam. A power source, physically separated from the power network, is preferably to be used for the heating unit to produce a voltage of less than 220 Volts, preferably 60 Volts or 24 Volts.

BRIEF DESCRIPTION OF THE DRAWINGS

Further characteristics and advantages of the invention will become apparent to those skilled in the art upon reading the following specification and by reference to the drawings in which.

DESCRIPTION OF THE PREFERRED EMBODIMENTS

Figure 1:
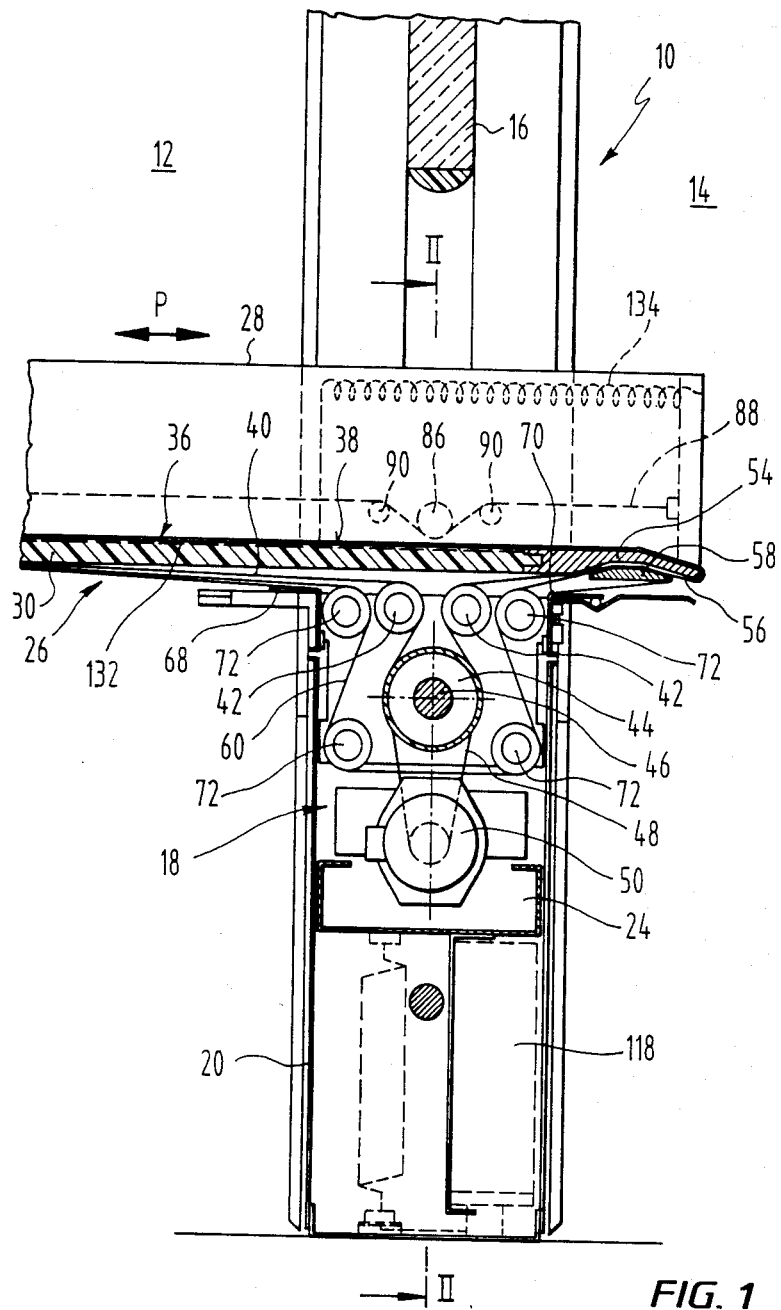
FIG. 1 is a schematic vertical section parallel to the sliding direction of the stage through a device built into the wall, according to a invention.

In FIG. 1, one can see a schematically illustrated hatchway (10) in a separating wall between two rooms 12 and 14. These rooms could, for instance, be a sterile and a non-sterile room in a hospital where the hatchway (10) is intended for patients. The hatchway can be closed off by a vertically adjustable window 16. To move patients between rooms 12 and 14 after opening the window 16, the apparatus described below is used.

Figure 2:
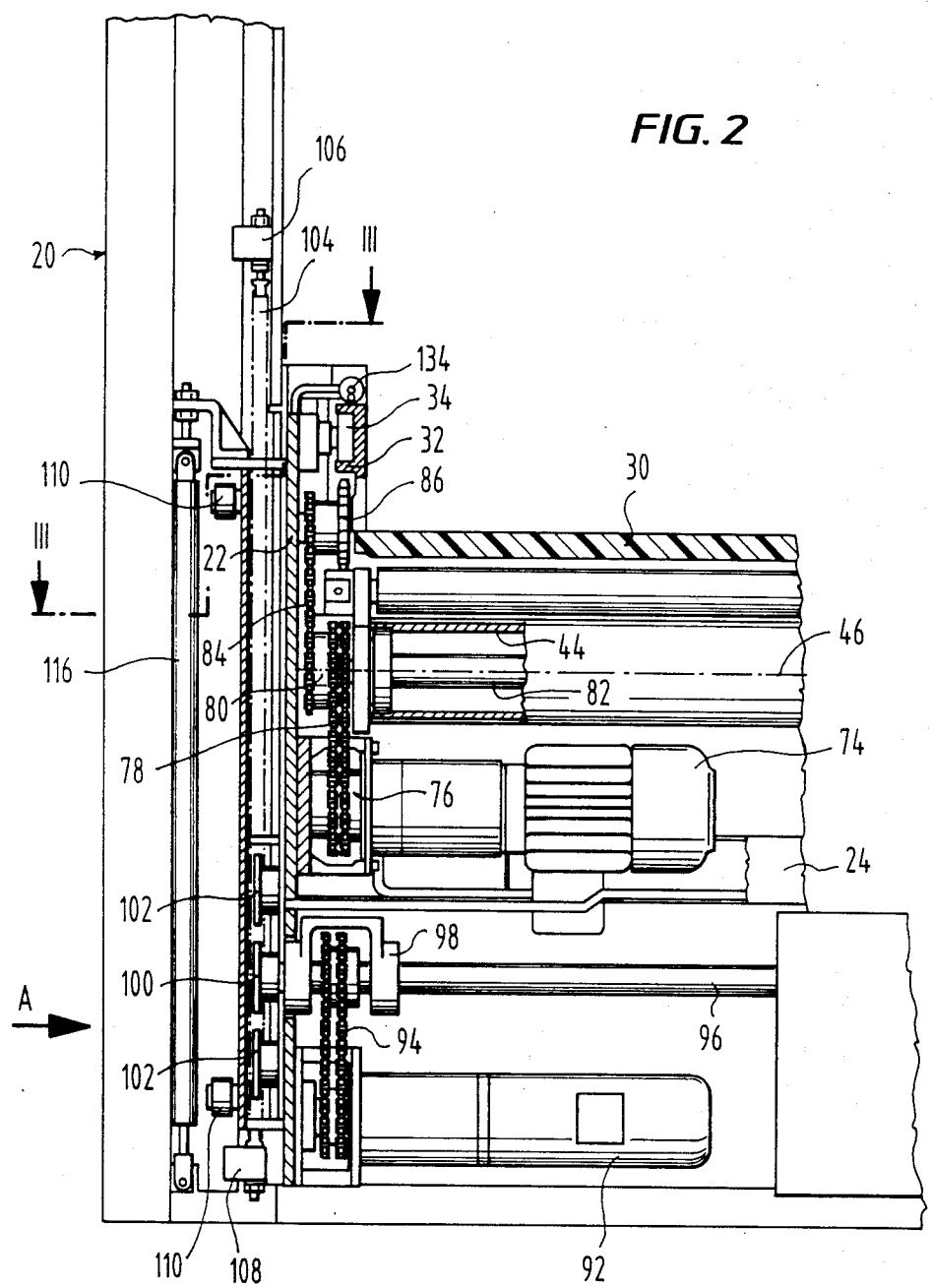
FIG. 2 is a partially schematic vertical section perpendicular to the sliding direction of the stage along Line II—II in FIG. 1.
Figure 3:
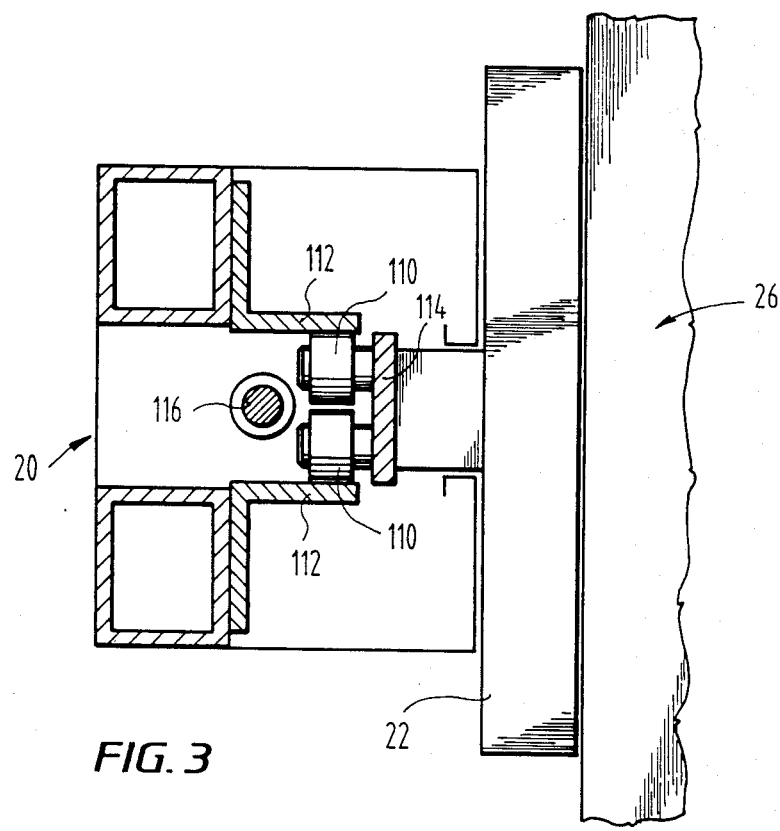
FIG. 3 is a partially schematic horizontal section along Line III—III in FIG. 2.
Figure 4:
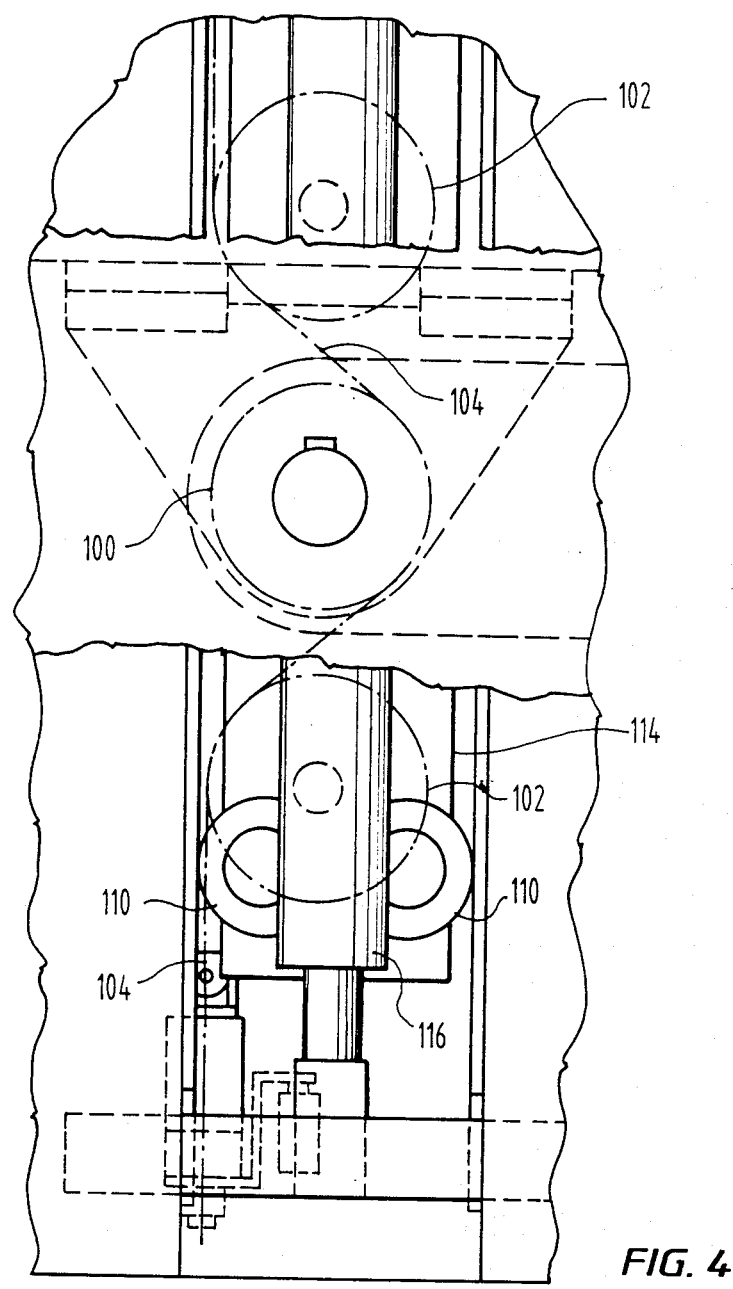
FIG. 4 is a schematic partial view of the height adjusting mechanism for the stage as viewed in the direction of the arrow A in FIG. 2.

The moving apparatus includes a lifting device, generally labelled 18, which is height adjustable on vertical columns 20 on both sides of the hatchway, as described more closely in FIGS. 2 through 4 further on. The lifting device 18 includes a lifting device with vertical frame side parts 22, connected to each other by a horizontal carrier 24 (FIG. 1 and 2). A stage, generally labelled 26, moveably adjustable in the direction of the double arrow P (FIG. 1) is attached to the lifting device.

The stage 26 includes two side walls 28 and, between these, a support surface 30. As illlustrated in the drawings on the outer surface of the side walls 28, facing the corresponding support column 20, there is in a C section rail 32 which grips freely rotating guide rollers 34 from the frame laterals 22. Over the support surface 30, is guided a continuous conveyor belt 36, the upper portion 38 of which totally covers the support surface 30 between the lateral walls 28 and the lower portion 40 of which is guided around a drive shaft 44 over some deviation rollers 42, so that the greater portion of its girth loops around the drive shaft. The drive shaft 44 is between frame lateral parts 22 rotating around an axis 46, parallel to the window plane 16 and that can be driven in both directions through a drive chain 48 by a motor 50 within the lifting device 18.

The support surface 30 is girdled by a metal frame 54 whose longitudinal profile, running perpendicular to the sliding direction P of the stage 26, are furnished with a recess 56, parallel to them, into which dips a deviation bar 58 for a lower belt 60. At its longitudinal ends, the deviation bar 58 is attached to a swivel arm 62, illustrated with a dotted line in FIG. 9.

Figure 9:
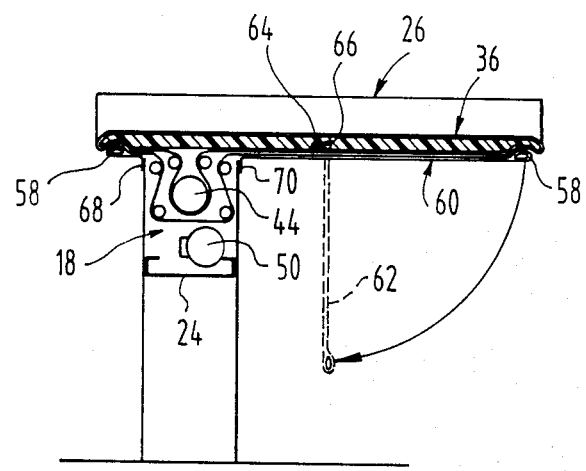

The swivel arms 62 are linked to rotate approximately in the middle of the support surface 30 around an axis 64 or 66, parallel to the axis 46 of the drive shaft 44, so that the frame being formed by the swivel arms 62 and the corresponding deviation bar 58 can be swivelled between the upper position shown as solid lines in FIG. 9 and the lower position shown as broken lines. The lower finite belt 60 is attached at both ends 68 and 70 to the lifting device and its upper portion is guided through the lifting device 18 by means of deviation rollers 72, 72 below the drive shaft 44. The lower belt 60 thus cannot be moved as a unit. A relative movement to the deviation bars 58 does, however, occur during horizontal sliding of the stage 30 in the direction of the double arrow P. As especially seen in FIG. 1, the strength or thickness of the stage section, lying between the lateral walls 28, is virtually equal to the strength of the support surface 30, whereas, in familiar apparatus designs, this section is double the thickness, because two plates are used to guide both belts.

The sliding operation of the stage 26 in the direction of the double arrow P is carried out with the help of a further drive motor 74, placed visually behind the motor 50 in FIG. 1, flanged onto the lateral part 22 of the frame (FIG. 2). Through a cog wheel 76 and a drive chain 78, its output shaft drives a cog wheel 80, on a shaft 82 that is set coaxially to the drive shaft 44 and that, by means fo a drive chain 84, drives a cog wheel 86 attached to the lateral part 22 of the frame so that it is freely rotating. This meshes with a traction chain 88, stretched between the two longitudinal ends of the lateral walls 28, illustrated with a broken line in FIG. 1 where tension wheels 90 attached to the lateral part of the frame so that they are freely rotating, ensure that this meshing action is maintained. If the chain cog wheel 86 is turned, the stage 26 moves according to the direction of rotation of the chain cog wheel 86 in the direction of the double arrow P.

The height adjustment of the lifting device 18 as well as of the stage 26 is operated by a height adjustment mechanism that will now be explained with the help of FIG. 2, 3 and 4. Flanged onto the lateral part 22 of the frame, the height adjusting mechanism includes a drive motor 92, that, by means of a drive chain 94, drives a shaft 96, parallel to the drive shaft 44, and which is built into bearings 98 attached to the underside of the carrier 24 and carries a chain cog wheel 100 at its free ends. Over and below the chain cog wheel 100, a chain cog wheel 102 is built on the outer side of the lateral part 22 of the frame so that it is freely rotating. These chain cog wheels 102 and 100 mesh with a stationary vertical chain 104, as illustrated in FIG. 4. The chain 104 is stretched between tension elements 106 and 108 that are attached to the support column 20. If the chain cog wheel 100 is driven by the drive motor 92, the entire lifting device moves up or down, including the stage and all drives whereby, by means of guides rollers 110, it is guided towards the support surfaces 112 of the support columns 20. The guide rollers 110 are attached to a vertical rail 114, connected to the lifting device and the chain cog wheels 100 and 102 are arranged between it and the lateral part 22 of the frame.

To create a weight balance for the lifting device and thereby to relieve the drive motor 92, the lifting device 18 is supported by means of a gas spring 116 built into the support columns 20. This gas spring 116 also serves to cushion the lifting device in case, for whatever reason, the height adjustment mechanism should fail and the lifting device 18 should therefore drop down.

As can be seen, the entire lifting device including the stage and all moveable parts of the various drive mechanisms make up a closed unit to which the switch cabinet 118, that can still be recognized in FIG. 1, also belongs. It is understood that, in the implementation design described above, the chain drive for the height adjustment of the lifting device and the spring elements 116 are furnished on both sides of the hatchway, whereas, on the one side of the lifting device, according to FIG. 2, the motor 74 for sliding the stage 26 and, on the other side of the hatchway, the motor 50 for the belt drive are arranged in mirror positions. The guide for the stage 26 on the lifting device 18, the chain drive for the sliding motion and the belt drive are, otherwise, constructed identically on both sides of the hatchway opening.

The various operation states of the apparatus explained above, shall now be described for the moving operation of a patient.

Figure 6:
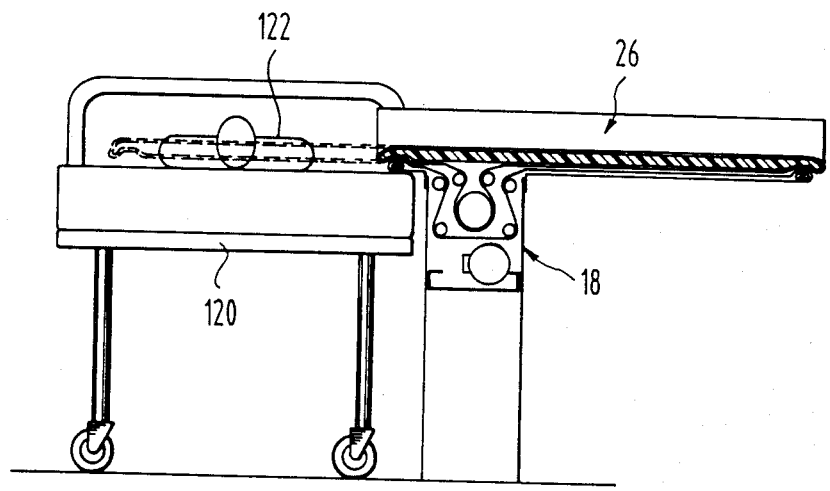
FIGS. 6–9 are simplified schematic section views to illustrate the various operation states of the apparatus according to the invention.

FIG. 6 shows a bed 120 with a schematically represented patient 122 where the stage 26 is at first mainly in the space 14.

Figure 7:
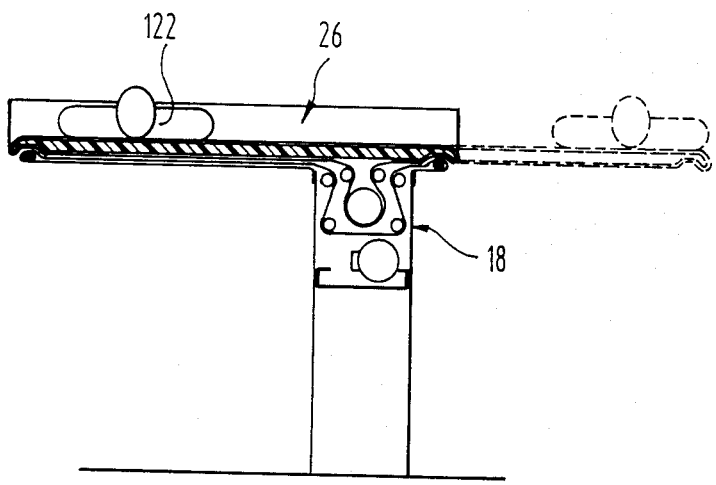

To pick up the patient 122, the support surface 30 of stage 26 is moved at a velocity $V_p$ to the left (e.g., via motor 74) as shown in FIG. 6 until it touches the patient's right shoulder. At the same time, the motor 50 is energized to turn drive shaft 44 at a clockwise circumferential velocity $V_a = 2 \cdot V_p$. This causes the lower part 40 of belt 36 to move to the left at the velocity $V_a$. When the support surface 30 continues to move to the left underneath the patient, the upper part 38 of the conveyor belt remains stationary with respect to the initial point of contact with the patient's shoulder, i.e. it does not move horizontally relative to the patient. The patient is not pulled by the belt 36 onto the support surface 30, but rather, the belt is laid under the patient. The drive motor 50 is turned off after the patient reaches the position shown in FIG. 7.

Figure 8:
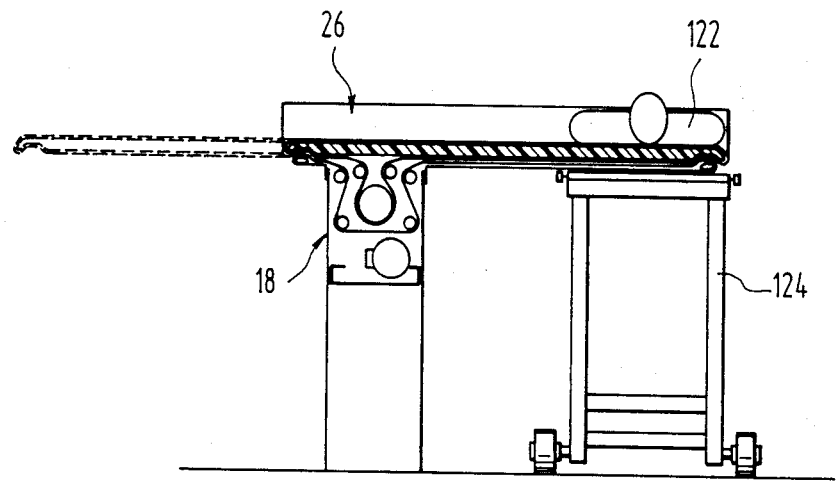

Then, the stage surface 30 is moved to the right thereby bringing the patient to the position shown in FIG. 8. It will be appreciated by those skilled in the art that the rightward movement of the support 30 at a velocity $V_p$ with the drive shaft 44 being held stationary causes the upper part 38 of the belt 36 to move to the right at a velocity $V_a = 2 \cdot V_p$ thereby carrying patient 122 to the right-most portion of the support surface 30. When the patient is disposed over the receiving surface such as the surface provided by moveable trolley 124, the support 30 is moved to the left as shown in the dotted lines in FIG. 8 with the same velocity data as for the procedure shown in FIG. 6, whereby the patient is placed onto the trolley 124.

FIG. 9 shows that by swinging the deviation rollers 58 of the lower belt 60 down, it can then be swung away from the support surface 30 and from the upper conveyor belt 36, respectively, so that all portions of the upper and lower belt 36 or 60 respectively, can be wiped clean and disinfected. The stage 26 can then be moved to the left from the position shown in FIG. 9 whereby then the left deviation bar 58 can be swung down and the cleaning and disinfecting procedure repeated there.

Figure 5:
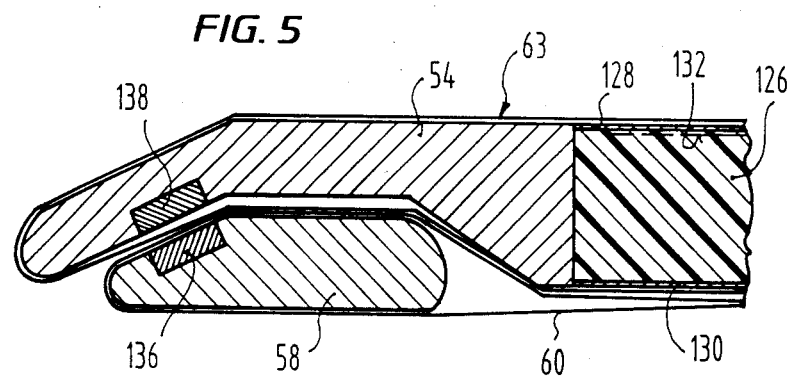
FIG. 5 is a schematic vertical partial section parallel to the sliding direction of the stage through the front range of the support surface and a bar.

According to FIGS. 1 and 5, the support surface 30 consists of a girdling metal frame 54, a plastic foam core 126 enclosed by it and the cover plates 128 or 130 respectively, enclosing it above and below. A heating foil 132, shown by broken lines in FIGS. 1 and 5, is glued to the under side of the upper cover plate 128. It is powered by a spiral cable 134 (FIGS. 1 and 2) positioned in one of walls 28, whereby the heating voltage is less than 220 Volt, preferably 60 Volt or 24 Volt. This heating voltage can be delivered by a transformer, physically separated from the power network. The heating performance should be ca. 0.5 to 1.5 Watt per $dm^2$. This makes it possible to bring the surface of the contact plate 30 to a temperature that is suited to the body temperature of a patient to be moved. If the above mentioned electrical data are chosen, a thermostatic heat control does not have to be used.

FIG. 5 shows a further characteristic of this invention. In the upper front area of the deviation bars 58 and in the lower front area of the edges of the support surface 30 running parallel to the deviation bars, contact strips 136 and 138 are arranged, which, not shown, are connected with the drive motor 50 of the belt drive in such a way that, when subjected to a pressure exceeding a certain threshold value, they cause the belt drive to be switched off. This ensures that sheets, patient clothing items or such do not get drawn between the support surface 30 and the deivation bars 58.

The above invention was described using the example of a stationary moving apparatus. It is understood that the design of the moving apparatus according to the invention, can also be applied to mobile moving apparati that, for example, serve to pick patients up from their beds, move them into another room and depose them again onto another surface.

What is claimed is:

1. In an apparatus for moving objects or persons, said apparatus including a support structure, a stage horizontally slideable along said structure and having a support surface, said support surface being surrounded by an upper continuous conveyor belt which is movable in parallel to the sliding direction of the stage by a belt drive, the improvement wherein the apparatus includes a lower belt (60) having outer ends thereof (68, 70) attached to the support structure (18, 20), a pair of bars (58) connected to the support surface (30), each bar located on one end of the support surface and running perpendicular to the sliding direction of the stage (26), a lower part (40) of the conveyor belt (36) being adapted to loop around a drive shaft (44) of the belt drive which is built into the support structure (18, 20), and the lower belt being carried over said bars (58) and guided through the support structure (18, (20) beneath the drive shaft (44) by means of rollers (72).

2. The improvement of claim 1 wherein each bar (59) is located in a recess (56) on the underside of the support surface (30).

3. The improvement of claim 2 wherein the ends of the bars (58) are connected to swivel arms (62), set perpendicular to their longitudinal direction, and the swivel arms being hinged to the support surface (30), pivoting around an axis (64, 66) parallel to the longitudinal direction of the bars.

4. The improvement of claim 3 wherein the support surface (30) is girdled by a surrounding metal frame (54).

5. The improvement of claim 4 wherein each recess (56) is formed in the metal frame (54) forming borders of the support surface and set square to the sliding direction of the stage.

6. The improvement of claim 5 wherein the support structure includes at least one vertical support column and a bearing frame designed to be set at different heights to which the stage is attached, and wherein a sliding drive for the stage (26) and a height setting drive are attached to a lifting device (18) together with the belt drive (50, 48, 44, 42).

7. The improvement of claim 6 wherein ends of the lifting device (18) are attached to two support columns (20), that a height adjusting motor (92), attached to the lifting device (18), drives a shaft (96), built into the lifting device (18), the shaft having ends of which are attached chain wheels (100) that grip into a chain (104), the chain spanning vertically the corresponding support column (20) and being held positively to the chain wheels (100) on the shaft (96) by means of chain wheels (102) built into the lifting device (18).

8. The improvement of claim 7 wherein vertical spring elements (116) between the supporting columns (20) and the lifting device (18), are arranged in such a way that they effect an at least partial weight balance of the lifting device (18).

9. The improvement of claim 1 wherein the support surface (30) contains a heating unit (132).

10. The improvement of claim 9 wherein the heating unit (132) is set directly onto the undersurface of an upper boundary plate (128) of the support surface (30) as a surface heater and wherein space between the heating unit (132) and a lower boundary plate (130) of the support surface (30) is filled with plastic foam.

11. The improvement of claim 10 wherein a voltage source is used to generate a heat voltage of less than 220 Volts.

12. The improvement of claim 11 wherein the heat output of the heating unit generates about 0.5 to 1.5 Watt per dm$^2$.

13. The improvement of claim 12 wherein the heating unit (132) is connected to the voltage source by means of a spiral cable (134).

14. The improvement of claim 1 wherein pressure sensitive contact elements (136, 138) are located on said bars (58) and support surface (30) and connected to the belt drive (50) in such a way that the belt drive is switched off when the pressure therebetween exceeds a certain threshold value.

15. The improvement of claim 14 wherein the contact elements are designed as contact strips (136, 138) stretching across the support surface (30).

* * * * *